(12) United States Patent
Ramachandra Iyer

(10) Patent No.: US 11,217,027 B2
(45) Date of Patent: Jan. 4, 2022

(54) METHOD AND SYSTEM FOR GENERATING AUGMENTED REALITY (AR)/VIRTUAL REALITY (VR) CONTENT IN REAL-TIME

(71) Applicant: Wipro Limited, Bangalore (IN)

(72) Inventor: Manjunath Ramachandra Iyer, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/819,505

(22) Filed: Mar. 16, 2020

(65) Prior Publication Data
US 2021/0287442 A1   Sep. 16, 2021

(30) Foreign Application Priority Data
Mar. 13, 2020   (IN) .............................. 202041010819

(51) Int. Cl.
| | |
|---|---|
| *G06T 19/00* | (2011.01) |
| *G06N 20/00* | (2019.01) |
| *G06N 5/04* | (2006.01) |
| *G06F 3/01* | (2006.01) |
| *G06F 16/435* | (2019.01) |
| *G16Y 40/30* | (2020.01) |
| *G16Y 10/40* | (2020.01) |

(52) U.S. Cl.
CPC ............ *G06T 19/006* (2013.01); *G06F 3/011* (2013.01); *G06F 16/435* (2019.01); *G06N 5/04* (2013.01); *G06N 20/00* (2019.01); *G16Y 10/40* (2020.01); *G16Y 40/30* (2020.01)

(58) Field of Classification Search
None
See application file for complete search history.

(56) References Cited

U.S. PATENT DOCUMENTS

| | | | |
|---|---|---|---|
| 10,978,046 B2* | 4/2021 | Huang | ................ G10L 15/1815 |
| 2018/0077451 A1 | 3/2018 | Yip et al. | |
| 2018/0285062 A1* | 10/2018 | Ulaganathan | ........... H04L 67/12 |
| 2019/0139321 A1 | 5/2019 | Kocharlakota et al. | |

FOREIGN PATENT DOCUMENTS

| | | |
|---|---|---|
| WO | 2018049430 A2 | 3/2018 |
| WO | 2018155750 A1 | 8/2018 |

* cited by examiner

*Primary Examiner* — Nicholas J Lee
(74) *Attorney, Agent, or Firm* — Finnegan, Henderson, Farabow, Garrett & Dunner, LLP

(57) ABSTRACT

The present disclosure discloses a method and a system for generating AR/VR content in real-time. The system upon receiving a user query or gestures, identifies query attributes and action attributes associated with IOT devices. Thereafter, system identifies IOT data corresponding to the query attributes and the action attributes from the IOT devices. Based on the IOT data, system generates multimedia content using trained machine learning model. The machine learning model is trained to provide multimedia content based on the IOT data associated with the query attributes or the action attributes. Thereafter, the system generates AR/VR content in real-time based on the multimedia content. In this manner, present disclosure supports interactive queries over AR/VR content and provides AR/VR content in real-time thereby reducing storage requirement for storing various images for interpolation.

12 Claims, 5 Drawing Sheets

METHOD AND SYSTEM FOR GENERATING AUGMENTED REALITY (AR)/VIRTUAL REALITY (VR) CONTENT IN REAL-TIME

TECHNICAL FIELD

The present subject matter is generally related to Augmented Reality/Virtual Reality (AR/VR) and more particularly, but not exclusively, to a method and a system for generating Augmented AR/VR content in real-time.

BACKGROUND

At present, Internet of Things (IoTs) have become popular and finds a huge space in digital solutions. They predominantly capture snapshot of the environment that they are designed for and provide data for further processing. To strengthen the visualization of the system dynamics captured using the IoT data, Augmented Reality (AR) and Virtual Reality (VR) content are increasingly used.

However, there is a lack of query mechanism supported over the AR/VR content in the existing methods, as the content itself exists for a short while and is highly dynamic and contextual. Further, to render the content, different User Interface (UI) frames may be required which calls for large memory and complex system requiring multiple UI layouts. Further, there is a lack of a mechanism to generate a framework based on the data to be rendered or based on the IoT itself.

The information disclosed in this background of the disclosure section is only for enhancement of understanding of the general background of the invention and should not be taken as an acknowledgement or any form of suggestion that this information forms the prior art already known to a person skilled in the art.

SUMMARY

Disclosed herein is a method of generating Augmented Reality (AR) content in real-time for a user query. The method comprises identifying one or more query attributes associated with one or more IOT devices in a user query. The method further comprises identifying IOT data corresponding to each of the one or more query attributes from the one or more IOT devices. Thereafter, the method comprises generating one or more multimedia content corresponding to the IOT data, wherein the one or more multimedia content is generated by a trained machine learning model based on the IOT data associated with each of the one or more query attributes. Upon generating the multimedia content, the method comprises generating the AR content in real-time in response to the user query based on the one or more multimedia content.

Further, the present disclosure discloses a method of generating Virtual Reality (VR) content in real-time. The method comprises identifying one or more gestures of a user while performing a user action associated with one or more IOT devices. The method also comprises identifying IOT data corresponding to each of one or more action attributes associated with the user action. Thereafter, the method comprises generating, one or more multimedia content corresponding to the IOT data and the one or more gestures, wherein the one or more multimedia content is generated by a trained machine learning model based on the IOT data associated with each of the one or more action attributes and the one or more gestures. Upon generating the one or more multimedia content, the method comprises generating the VR content in real-time in response to the one or more gestures based on the one or more multimedia content.

Furthermore, the present disclosure discloses a content generation system for generating Augmented Reality (AR) content in real-time for a user query. The content generation system comprises a processor and a memory. The memory is communicatively coupled to the processor, wherein the memory stores processor-executable instructions, which, on execution, causes the processor to identify one or more query attributes associated with one or more IOT devices in a user query and identify IOT data corresponding to each of the one or more query attributes from the one or more IOT devices. Thereafter, the processor generates one or more multimedia content corresponding to the IOT data, wherein the one or more multimedia content is generated by a trained machine learning model based on the IOT data associated with each of the one or more query attributes. Once the one or more multimedia content is generated, the processor generates AR content in real-time in response to the user query based on the one or more multimedia content.

Further the present disclosure discloses a content generation system for generating Virtual Reality (VR) content in real-time. The content generation system comprises a processor and a memory. The memory is communicatively coupled to the processor, wherein the memory stores processor-executable instructions, which, on execution, causes the processor to identify one or more gestures of a user while performing a user action associated with one or more IOT devices and identify IOT data corresponding to each of one or more action attributes associated with the user action. Thereafter, the processor generates one or more multimedia content corresponding to the IOT data and the one or more gestures, wherein the one or more multimedia content is generated by a trained machine learning model based on the IOT data associated with each of the one or more action attributes and the one or more gestures. Once the one or more multimedia content is generated, the processor generates the VR content in real-time in response to the one or more gestures based on the one or more multimedia content.

Furthermore, the present disclosure comprises a non-transitory computer readable medium including instructions stored thereon that when processed by at least one processor causes the processor to generate Augmented Reality AR content in real-time. Further, the instructions cause the processor to identify one or more query attributes associated with one or more IOT devices in a user query. Furthermore, the instructions cause the processor to identify IOT data corresponding to each of the one or more query attributes from the one or more IOT devices. Thereafter, the instructions cause the processor to generate one or more multimedia content corresponding to the IOT data wherein the one or more multimedia content is generated by a trained machine learning model based on the IOT data associated with each of the one or more query attributes. Finally, the instructions cause the processor to generate, the AR content in real-time in response to the user query based on the one or more multimedia content.

Furthermore, the present disclosure comprises a non-transitory computer readable medium including instructions stored thereon that when processed by at least one processor causes the processor to generate Virtual Reality (VR) content in real-time by. The instructions cause the processor to identify one or more gestures of a user 105 while performing a user action associated with one or more IOT devices. The instructions cause the processor to identify IOT data corresponding to each of one or more action attributes associated with the user action. Thereafter, the instructions cause the processor to generate one or more multimedia content corresponding to the IOT data and the one or more gestures, wherein the one or more multimedia content is generated by a trained machine learning model based on the IOT data associated with each of the one or more action attributes and the one or more gestures. Further, the instructions cause the processor generating the VR content in real-time in response to the one or more gestures based on the one or more multimedia content.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1:
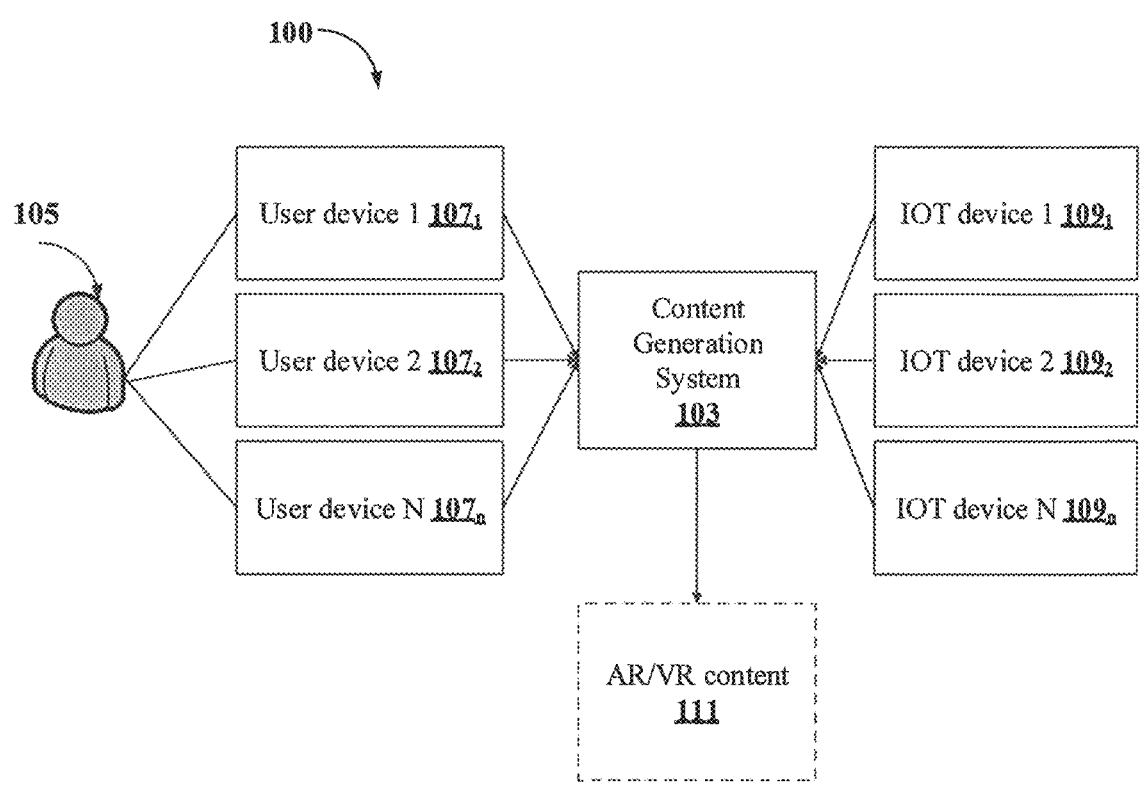
FIG. 1 shows an exemplary architecture for generating AR/VR content in real-time in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternatives falling within the scope of the disclosure.

The terms "comprises", "comprising", "includes", "including" or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure discloses a method and a system for generating Augmented Reality (AR)/Virtual Reality (VR) content in real-time. The system refers to a content generation system. In one embodiment, the user may provide a user query based on which the AR content may be generated. In this scenario, the system upon receiving the user query may identify one or more query attributes associated with one or more IOT devices in the user query. The one or more query attributes may be associated with temperature, pressure, illumination, and the like. Thereafter, the system may identify IOT data corresponding to each of the one or more query attributes from the one or more IOT devices. Based on the IOT data, the system may generate one or more multimedia content using a trained machine learning model. The machine learning model is trained to provide multimedia content based on IOT data associated with one or more query attributes. Thereafter, the system may generate the AR content in real-time in response to the user query based on the one or more multimedia content. In another embodiment, instead of user query, the system may receive one or more gestures of a user when the user is performing an action associated with one or more IOT devices. In this scenario, the system may identify IOT data corresponding to one or more action attributes associated with the user action. The action attributes may be for example, angle of viewing of the user, head movement, hand movement and leg movement. Thereafter, the system may generate one or more multimedia content corresponding to the IOT data and the one or more gestures using a trained machine learning model. The machine learning model may be trained to generate one or more multimedia content based on the IOT data associated with each of the one or more action attributes and the one or more gestures. In this manner, the present disclosure provides a method and a system which supports interactive queries over AR/VR content and provides AR/VR content in real-time thereby reducing storage requirement for storing various images for interpolation to generate AR/VR content.

FIG. 1 shows an exemplary architecture for generating AR/VR content in real-time in accordance with some embodiments of the present disclosure.

The architecture may include a content generation system 103 (hereinafter the "system"), one or more IOT devices, IOT device 1 109$_1$ to IOT device N109$n$ (collectively referred as one or more IOT devices 109) and one or more user devices, user device 1 107$_1$ to user device N 107$n$ (collectively referred as user devices 107). The one or more IOT devices 109 may include but not limited to a pressure sensor, a temperature sensor, a blood pressure sensor, an Electrocardiogram (ECG) sensor and an image capturing device such as a camera. The one or more user devices 107 may include but not limited to a haptic glove, a head mount display and the camera. The one or more user devices 107 may be virtual devices.

In one embodiment, the system 103 may receive a user query from a user 105 for generating Augmented Reality (AR) content in real-time. In this scenario, the system 103 may identify one or more query attributes associated with one or more IOT devices 109 in the user query. As an example, the user query may be "show me the regions in the warehouse with lowest temperature". The one or more IOT devices 109 associated with the user query may be a "temperature sensor" and the one or more query attributes may be "lowest temperature". Thereafter, the system 103 may identify IOT data corresponding to each of the one or more query attributes from the one or more IOT devices 109. In this scenario, the system 103 may receive IOT data from the temperature sensor. Upon identifying the IOT data, the system 103 may generate one or more multimedia content corresponding to the IOT data using a trained machine learning model. The multimedia content is a combination of text, audio, images, animations, video, and interactive content from the one or more IOT devices 109. In an embodiment, the machine learning model may be trained based on the IOT data associated with each of the one or more query attributes. As an example, the IOT data may be received from two IOT devices 109, IOT device 1 and IOT device 2. Therefore, the machine learning model is trained to generate multimedia content based on the IOT data received from the IOT device 1 and the IOT device 2. The system 103 may use the generated one or more multimedia content for generating the AR content 111 by rendering the one or more multimedia content in 3-D space along with time stamp information of each IOT data from the corresponding IOT devices 109.

In another embodiment, the system 103 may identify one or more gestures of a user 105 while the user 105 is performing an action associated with one or more IOT devices 109 for generating Virtual Reality (VR) content in real-time. As an example, the user 105 may be associated with one or more user devices 107 such as haptic gloves, head mount display and camera while the user 105 is performing an action. As an example, the user action may be "visualizing flow of blood in coronary arteries". While the user 105 is performing this action, the user 105 may provide one or more gestures such as turning head right side or left side which may be captured by the cameras. Based on the gestures, the system 103 may identify turning angle of the head of the user 105 according to which the VR content may be rendered. Therefore, the system 103 may identify the IOT data corresponding to each of one or more action attributes associated with the user action. The IOT data may be identified from the IOT devices 109 such as blood pressure sensor. Upon identifying the IOT data for example, ECG data, blood pressure data, the system 103 may generate one or more multimedia content corresponding to the IOT data and the one or more gestures using a trained machine learning model. In an embodiment, the machine learning model may be trained to generate the one or more multimedia content based on the IOT data from the one or more IOT devices 109 and one or more gestures of the user 105. Upon generating the one or more multimedia content, the system 103 may generate VR content 111 in real-time based on the one or more multimedia content by rendering the one or more multimedia content in 3-D space along with time stamp information of each IOT data.

In an embodiment, a User Interface (UI) of a device associated with the user 105 for rendering the AR/VR content may be changed based on one or more IOT devices 109 in communication with the device associated with the user 105. In this manner, the present disclosure provides AR/VR content in real-time based on user queries and gestures. Further, since present disclosure generates AR/VR content in real-time, the storage requirement for storing various images for interpolation to generate AR/VR content is reduced.

Figure 2:
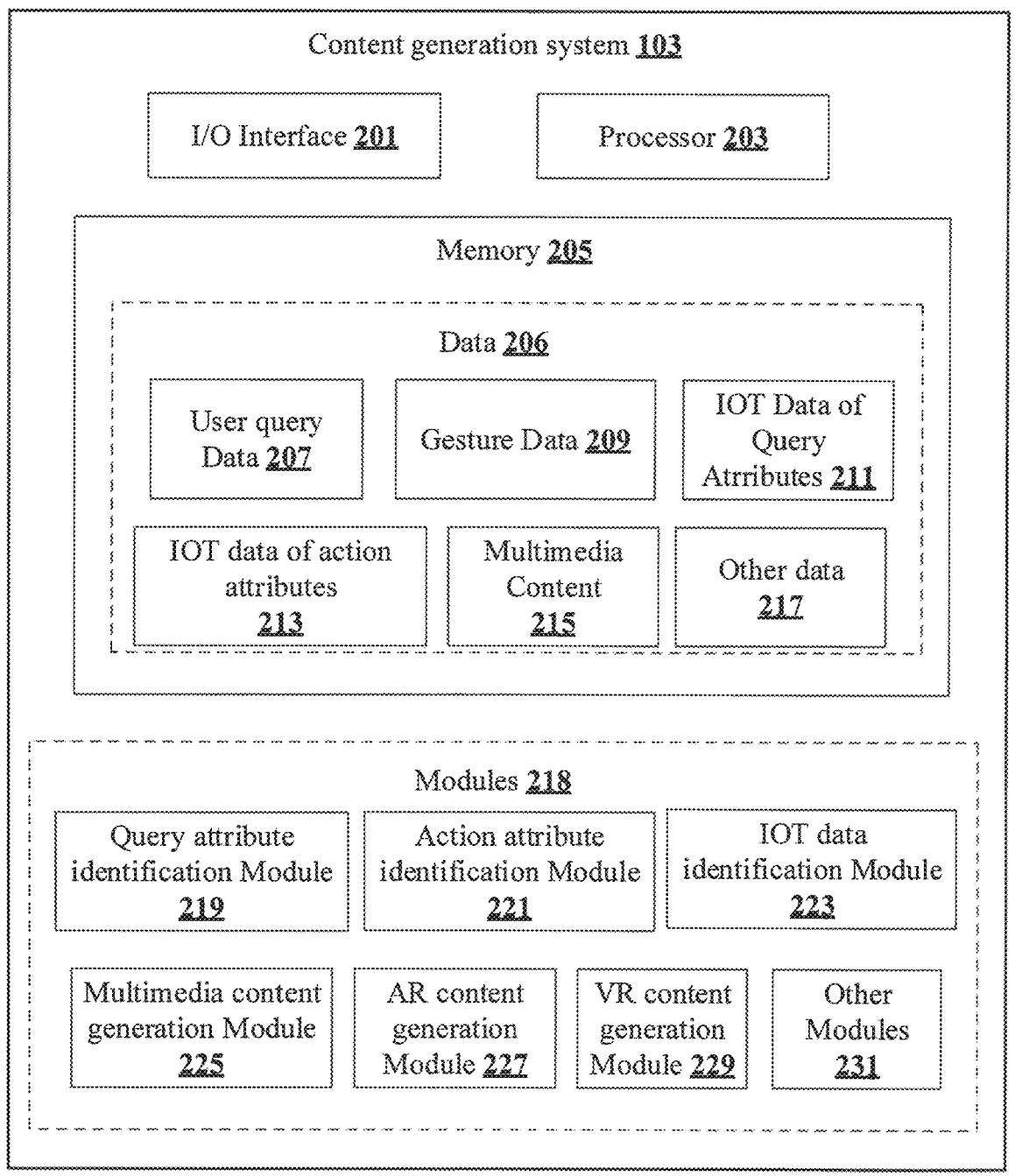
FIG. 2 shows a block diagram of a content generation system in accordance with some embodiments of the present disclosure.

FIG. 2 shows a block diagram of a content generation system in accordance with some embodiments of the present disclosure.

In some implementations, the content generation system 103 may include an I/O interface 201, a processor 203, and a memory 205. The I/O interface 201 may be configured to receive the user query and one or more gestures. The processor 203 may be configured to generate the AR content based on the user query and generate the VR content based on the one or more gestures. The content generation system 103 may include data 206 and modules 218. As an example, the data 206 is stored in a memory 205 configured in the system 103 as shown in the FIG. 2. In one embodiment, the data 206 may include user query data 207, gesture data 209, IOT data of query attributes 211, IOT data of action attributes 213, multimedia content 215, and other data 217. In the illustrated FIG. 2, modules are described herein in detail.

In some embodiments, the data 206 may be stored in the memory 205 in form of various data structures. Additionally, the data 206 can be organized using data models, such as relational or hierarchical data models. The other data 217 may store data, including temporary data and temporary files, generated by the modules for performing the various functions of the system 103.

In some embodiments, the data 206 stored in the memory 205 may be processed by the modules 218 of the system 103. The modules 218 may be stored within the memory 205. In an example, the modules 218 communicatively coupled to the processor 203 configured in the system 103, may also be present outside the memory 205 as shown in FIG. 2 and implemented as hardware. As used herein, the term modules 218 may refer to an Application Specific Integrated Circuit (ASIC), an electronic circuit, a processor 203 (shared, dedicated, or group) and memory 205 that execute one or more software or firmware programs, a combinational logic circuit, and/or other suitable components that provide the described functionality.

In some embodiments, the modules 218 may include, for example, a query attribute identification module 219, an action attribute identification module 221, an IOT data identification module 223, a multimedia content generation module 225, AR content generation module 227, VR content generation module 229, and other modules 231. The other modules 231 may be used to perform various miscellaneous functionalities of the system 103. It will be appreciated that such aforementioned modules 218 may be represented as a single module or a combination of different modules.

In an embodiment, the other modules 231 may be used to perform various miscellaneous functionalities of the system 103. It will be appreciated that such modules may be represented as a single module or a combination of different modules. Furthermore, a person of ordinary skill in the art will appreciate that in an implementation, the one or more modules may be stored in the memory 205, without limiting the scope of the disclosure. The said modules when configured with the functionality defined in the present disclosure will result in a novel hardware.

In an embodiment, the query attribute identification module 219 may be configured to identify one or more query attributes in a user query. As an example, the user 105 may provide user query for generating AR content. The user query may comprise one or more query attributes associated with one or more IOT devices 109 in the user query. As an example, the user query may be "show me the regions of the building where the temperature is less than 20 degree Celsius". The one or more IOT devices 109 involved in the user query is a "temperature sensor" and the one or more query attributes is "less than 20 degree Celsius". The identified one or more query attributes may be stored as user query data 207.

In an embodiment, the action attribute identification module 221 may be configured to identify one or more action attributes associated with a user action. As an example, the user 105 may be performing an action and while performing the action, one or more gestures of the user 105 may be identified which may be associated with one or more IOT devices 109. The identified one or more gestures may be stored as gesture data 209. As an example, "the user 105 may be playing a cricket game in virtual world". While performing the user action which is "playing cricket", the system 103 may identify one or more gestures of the user 105 such as hand movement for hitting the ball using one or more devices associated with the user 105 such as haptic gloves, head mount display and cameras. The one or more action attributes may be hand movement, leg movement or any other gesture while performing the user action.

In an embodiment, the IOT data identification module 223 may be configured to identify IOT data corresponding to query attributes when the user query is received and configured to identify IOT data corresponding to action attributes when the one or more gestures of the user 105 is identified. The IOT data identification module 223 may identify the IOT data corresponding to the query attributes from the one or more IOT devices 109. In the exemplary user query "show me the regions of the building where the temperature is less than 20 degree Celsius", the IOT data identified may correspond to temperature data of a region which is less than 20 degree Celsius. The identified IOT data corresponding to the query attributes may be stored as IOT data of query attributes 211.

Further, the IOT data identification module 223 may identify the IOT data corresponding to the one or more action attributes associated with the user action. As an example, the user action may be "visualizing the flow of blood in coronary arteries" and while performing this user action, the user 105 may change the angle of viewing. Therefore, the IOT data identification module 223 identifies IOT data which is ECG data from an ECG sensor with respect to the angle of viewing of the user 105. The identified IOT data corresponding to the one or more action attributes may be stored as IOT data of action attributes 213.

In an embodiment, the multimedia content generation module 225 may be configured to generate one or more multimedia content corresponding to IOT data when the user query is received and configured to generate one or more multimedia content corresponding to TOT data and the one or more gestures when the one or more gestures are identified while the user action is performed. In one embodiment, the machine learning model may be a Generative Adversarial Networks (GAN) model. The multimedia content generation module 225 may generate one or more multimedia content corresponding to the IOT data using a trained machine learning model. The machine learning model may be trained based on IOT data from one or more IOT devices 109 for one or more query attributes. As an example, the one or more IOT devices 109 may be IOT device 1 which may be a "pressure sensor" and IOT device 2 which may be a "temperature sensor". The data from the IOT device 1 may be Data 1 and the data from the IOT device 2 may be Data 2. These data may correspond to query attributes. As an example, the query attribute may be "low". Therefore, the Data 1 and the Data 2 may provide low pressure and low temperature data. Similarly, if the query attribute is "high" then the Data 1 and the Data 2 may correspond to high pressure and high temperature data. Based on Data 1 and Data 2, the machine learning model may generate multimedia content as shown in below Table 1. As an example, the machine learning model may be trained to generate multimedia content 1 when the Data 1 and Data 2 is received from IOT device 1 and IOT device 2 for the query attribute "low". Similarly, the machine learning model may be trained to generate multimedia content 2 when the Data 1 and Data 2 is received from the IOT device 1 and the IOT device 2 for the query attribute "high".

TABLE 1

| IOT 1 | IOT 2 | Query Attribute | Content |
| --- | --- | --- | --- |
| Data 1 | Data 2 | Low | Multimedia content 1 |
| Data 1 | Data 2 | High | Multimedia content 2 |

Further, the multimedia content generation module 225 may be configured to generate one or more multimedia content corresponding to the TOT data and the one or more gestures when the one or more gestures are identified while the user 105 is performing an action using a trained machine learning model. The machine learning model may be trained based on the IOT data and the one or more gestures. As an example, the one or more TOT devices 109 may be IOT device 1 which may be an ECG sensor and IOT device 2 which may be a blood pressure sensor. The data from the TOT device 1 may be Data 1 and the data from the IOT device 2 may be Data 2. The data along with one or more gestures of the user 105 may be considered for generating the one or more multimedia content as shown in Table 2. As an example, the one or more gestures may be with respect to viewing angle of the user 105 while visualizing flow of blood in coronary arteries.

TABLE 2

| IOT 1 | IOT 2 | Gesture-Viewing Angle | Content |
| --- | --- | --- | --- |
| Data 1 | Data 2 | Left | Multimedia content 1 |
| Data 1 | Data 2 | Right | Multimedia content 2 |

As an example, the machine learning model may be trained to generate multimedia content 1 when the Data 1 and Data 2 is received from IOT device 1 and IOT device 2 and when the user 105 is viewing left side of the arteries. Similarly, the machine learning model may be trained to generate multimedia content 2 when the Data 1 and Data 2 is received from the TOT device 1 and the TOT device 2 and when the user 105 is viewing right side of the arteries. In an embodiment the generated multimedia content may be stored as multimedia content 215.

In an embodiment, the machine learning model may be trained for various query attributes and one or more gestures to generate corresponding one or more multimedia content. In one implementation, the query attributes may be detected from the IOT devices 109. In another implementation, it may be obtained from a user 105. Further, the machine learning model may be updated when object under consideration is changed. As an example, the model may be implemented to generate one or more multimedia content to view blood flow in the heart of a person, (through echocardiogram) and it may require fine tuning for another person. A few sample images with new object of interest may be obtained to generate the one or more multimedia content. Therefore, the machine learning model may be trained with new data treating it as additional data set for generating the multimedia content.

In an embodiment, the AR content generation module 227 may be configured to generate AR content based on the one or more multimedia content in response to the user query. The AR content may be generated by rendering the one or more multimedia content in a 3D space along with time stamp information of each TOT data.

In an embodiment, the VR content generation module 229 may be configured to generate VR content based on the one or more multimedia content and the one or more gestures. The VR content may be generated by rendering the one or more multimedia content in a 3-D space along with time stamp information of each IOT data.

In an embodiment, the User Interface (UI) of the user device may be changed as per the content to be rendered on the user device. The UI component may also store software defined IOT for communicating with one or more IOT devices 109.

Figure 3:
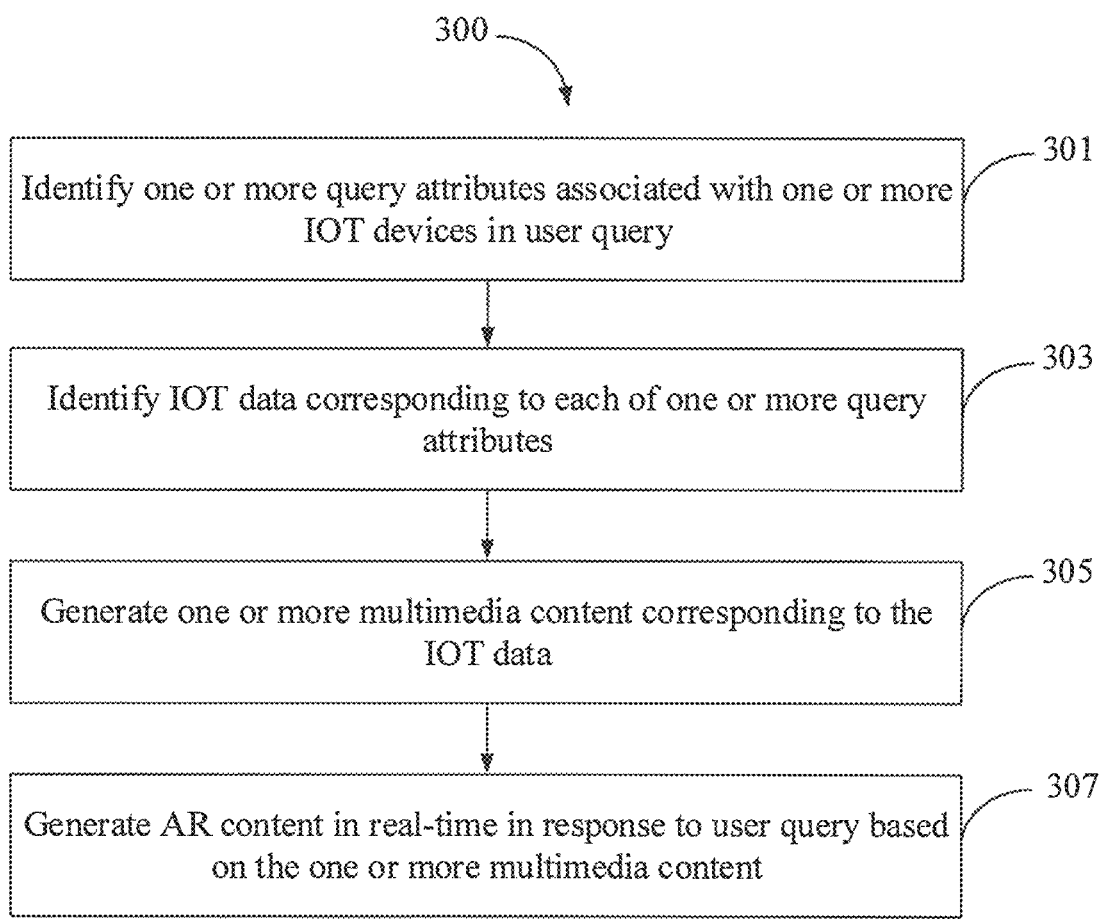
FIG. 3 shows a flowchart illustrating a method of generating AR content in real-time in accordance with some embodiments of the present disclosure.

FIG. 3 shows a flowchart illustrating a method of generating AR content in real-time in accordance with some embodiments of the present disclosure.

As illustrated in FIG. 3, the method 300 includes one or more blocks illustrating a method of generating AR content in real-time. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the method may include identifying one or more query attributes associated with one or more IOT devices 109 in a user query. As an example, the one or more query attributes associated with temperature sensor may be "hot", "cold", "medium". Similarly, the one or more query attributes associated with pressure sensor may be "high" or "low".

At block 303, the method may include identifying IOT data corresponding to each of the one or more query attributes from the one or more IOT devices 109. As an example, the user query may comprise the query attributes high and low associated with IOT device pressure sensor. Therefore, the IOT data may correspond to high-pressure data and low-pressure data.

At block 305, the method may include generating one or more multimedia content corresponding to the IOT data. The one or more multimedia content is generated by a trained machine learning model based on the IOT data associated with each of the one or more query attributes. The machine learning model may be trained to generate the one or more multimedia content based on the IOT data from one or more IOT devices 109.

At block 307, the method may include generating the AR content in real-time in response to the user query based on the one or more multimedia content. The AR content may be generated by rendering the one or more multimedia content in a 3D space along with timestamp information of each IOT data received from one or more IOT devices 109.

Figure 4:
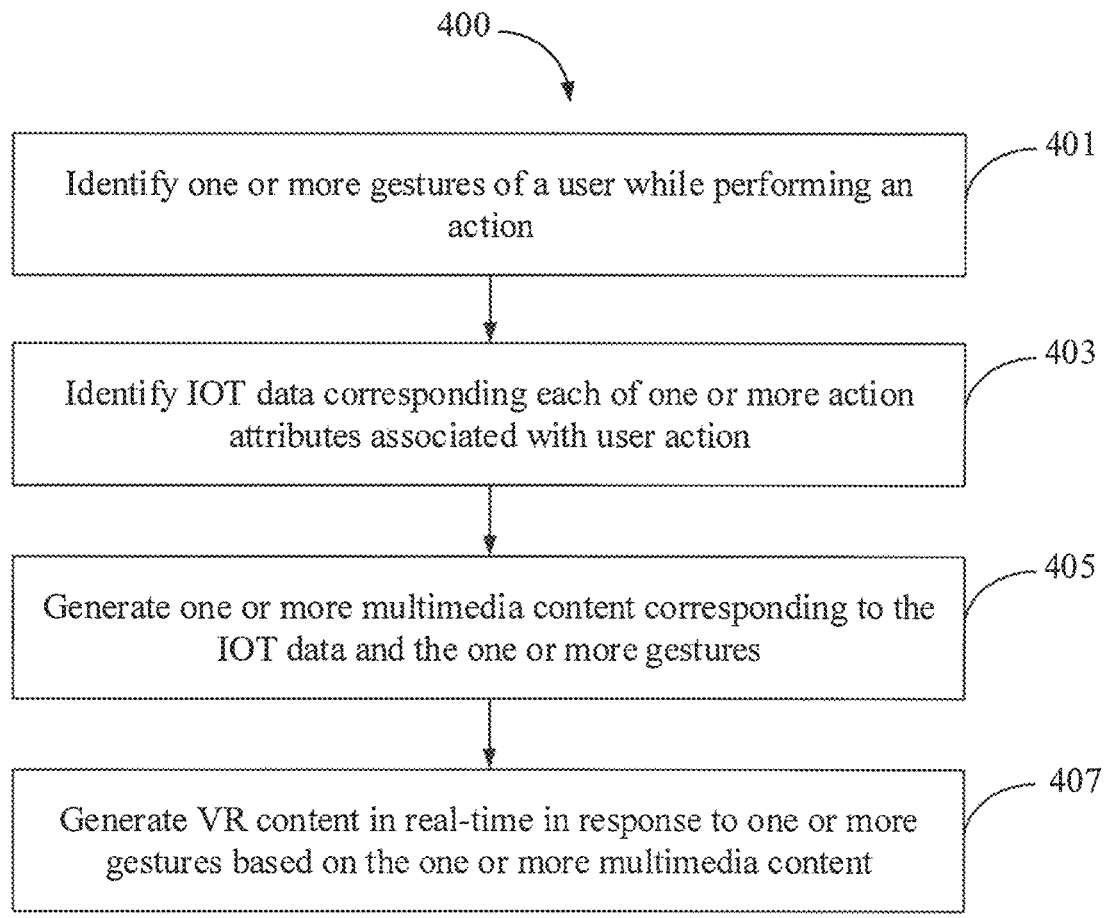
FIG. 4 shows a flowchart illustrating a method of generating VR content in real-time in accordance with some embodiments of the present disclosure.

FIG. 4 shows a flowchart illustrating a method of generating VR content in real-time in accordance with some embodiments of the present disclosure.

As illustrated in FIG. 4, the method 400 includes one or more blocks illustrating a method of generating VR content in real-time. The method 400 may be described in the general context of computer executable instructions. Generally, computer executable instructions can include routines, programs, objects, components, data structures, procedures, modules, and functions, which perform specific functions or implement specific abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the method may include identifying one or more gestures of a user 105 while performing a user action associated with one or more IOT devices 109.

At block 403, the method may include identifying IOT data corresponding to each of one or more action attributes associated with the user action. As an example, "the user 105 may be playing a cricket game in a virtual world". While performing the user action which is "playing cricket", the system 103 may identify one or more gestures of the user 105 such as hand movement for hitting the ball using one or more devices associated with the user 105 such as haptic gloves, head mount display and cameras. The one or more action attributes may be hand movement or leg movement or any other gesture while performing the user action.

At block 405, the method may include generating one or more multimedia content corresponding to the IOT data and the one or more gestures. The one or more multimedia content is generated by a trained machine learning model based on the IOT data associated with each of the one or more action attributes. The machine learning model may be trained to generate the one or more multimedia content based on the IOT data associated with each of the one or more action attributes and the one or more gestures.

At block 407, the method may include generating the VR content in real-time in response to the one or more gestures based on the one or more multimedia content. The VR content may be generated by rendering the one or more multimedia content in a 3D space along with timestamp information of each IOT data received from one or more IOT devices 109.

Exemplary Scenario

Figure 5:
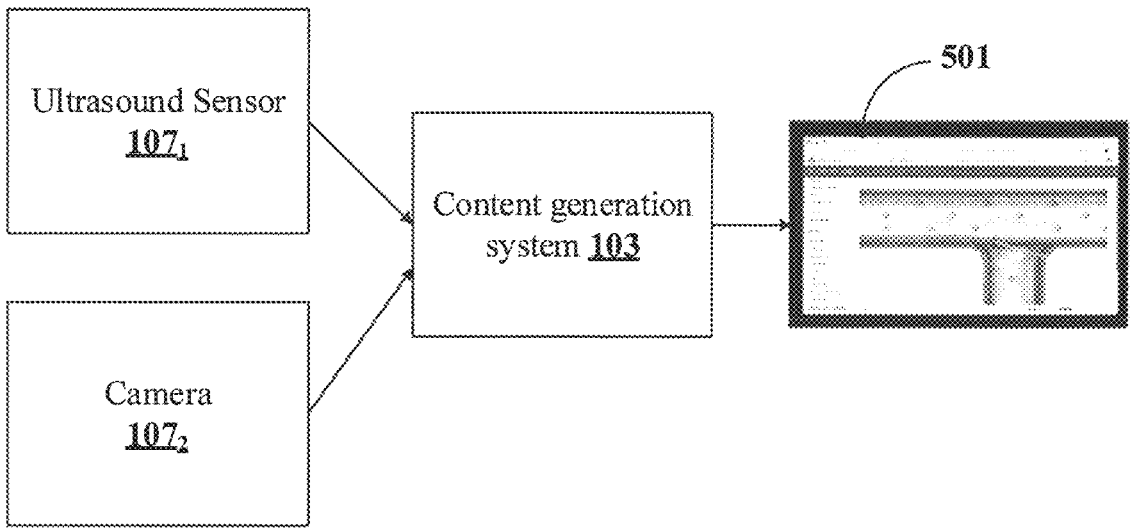
FIG. 5 shows an exemplary environment for rendering AR/VR content in real-time in accordance with some embodiments of the present disclosure.

As an example, "User A" 105 is medically advised to eat only when the stomach is nearly empty. The present disclosure may be implemented in this scenario to render AR/VR content in real-time to the "User A" 105 to see the dynamics of his/her digestion in the UI 501 of a device associated with the "User A" 105 and also to see how much of his/her stomach is empty at any given point of time. As an example, the "User A" 105 may be wearing a stomach belt which comprise ultrasound sensors. The ultrasound sensors provide information on how much of "User A's" stomach is empty at a given point of time. The system 103 receives IOT data which is from an IOT device such as ultrasound sensors $107_1$ and from a camera $107_2$ which provides information on what the user is eating. Based on the IOT data, the system 103 generates multimedia content using a trained machine learning model. Based on the multimedia content, the system 103 generates AR data which is rendered on the UI 501 as shown in FIG. 5. The "User A" 105 views the dynamics of his/her digestion in the UI 501 and decide on when to eat and how much to eat.

Computer System

Figure 6:
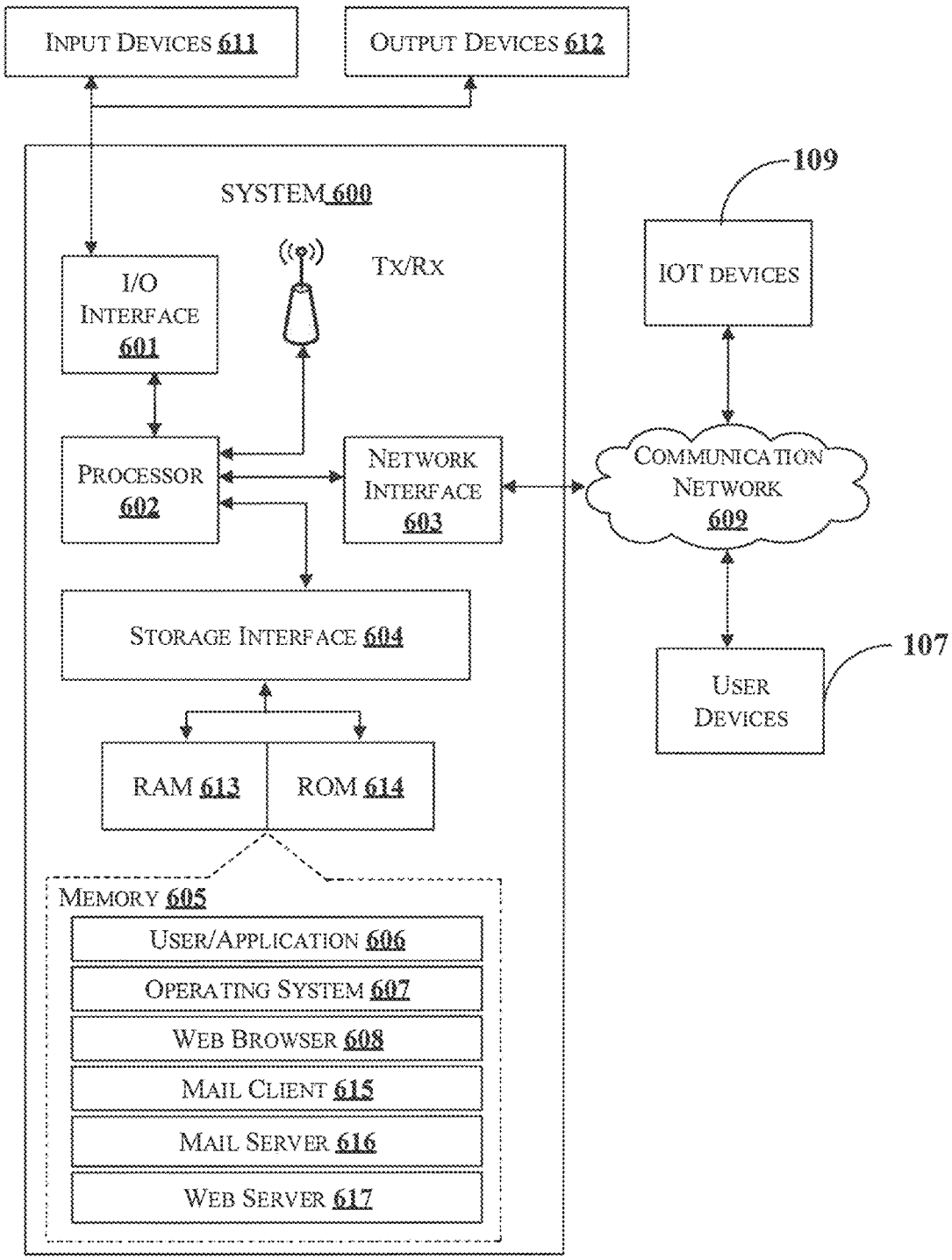
FIG. 6 illustrates a block diagram of an exemplary computer system for implementing embodiments consistent with the present disclosure.

FIG. 6 illustrates a block diagram of an exemplary computer system 600 for implementing embodiments consistent with the present disclosure. In an embodiment, the computer system 600 may be a content generation system 103, which is used for generating AR/VR content in real-time. The computer system 600 may include a central processing unit ("CPU" or "processor") 602. The processor 602 may comprise at least one data processor for executing program components for executing user or system-generated business processes. The processor 602 may include specialized processing units such as integrated system (bus) controllers, memory management control units, floating point units, graphics processing units, digital signal processing units, etc.

The processor 602 may be disposed in communication with one or more input/output (I/O) devices (611 and 612) via I/O interface 601. The I/O interface 601 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the U/O interface 601, the computer system 600 may communicate with one or more I/O devices 611 and 612.

In some embodiments, the processor 602 may be disposed in communication with a communication network 609 via a network interface 603. The network interface 603 may communicate with the communication network 609. The network interface 603 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc.

The communication network 609 can be implemented as one of the several types of networks, such as intranet or Local Area Network (LAN) and such within the organization. The communication network 609 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 609 may include a variety of network devices, including routers, bridges, servers, computing devices, storage devices, etc.

In some embodiments, the processor 602 may be disposed in communication with a memory 605 (e.g., RAM 613, ROM 614, etc. as shown in FIG. 6) via a storage interface 604. The storage interface 604 may connect to memory 605 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user/application 606, an operating system 607, a web browser 608, a mail client 615, a mail server 616, a web server 617, and the like. In some embodiments, computer system 600 may store user/application data 606, such as the data, variables, records, etc. as described in this invention. Such databases may be implemented as fault-tolerant, relational, scalable, secure databases such as Oracle® or Sybase®.

The operating system 607 may facilitate resource management and operation of the computer system 600. Examples of operating systems 607 include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLER ANDROID™, BLACKBERRY® OS, or the like. A user interface may facilitate display, execution, interaction, manipulation, or operation of program components through textual or graphical facilities. For example, user interfaces may provide computer interaction interface elements on a display system operatively connected to the computer system 600, such as cursors, icons, check boxes, menus, windows, widgets, etc. Graphical User Interfaces (GUIs) may be employed, including, without limitation, APPLE MACINTOSH® operating systems, IBM™ OS/2, MICROSOFT™ WINDOWS™ (XP™, VTSTA™/7/8, 10 etc.), Unix® X-Windows, web interface libraries (e.g., AJAX™, DHTML™, ADOBE® FLASH™, JAVASCRIPT™, JAVA™, etc.), or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein.

In an embodiment, the present disclosure provides method and system for generating AR/VR content in real-time.

In an embodiment, the present disclosure supports interactive queries over AR/VR content.

In an embodiment, the present disclosure generates AR/VR content in real-time thereby reducing storage requirement for storing various images for interpolation for generating AR/VR content.

In an embodiment, in the present disclosure the User Interface is dynamically linked to content generated in real-time.

In an embodiment, the present disclosure implements a machine learning model which is trained for generating multimedia content based on IOT data, query attributes and action attributes using which AR/VR content is rendered in real-time.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of generating Virtual Reality (VR) content in real-time, the method comprising:
   identifying, by a content generation system, one or more gestures of a user 105 while performing a user action associated with one or more Internet of Things (IOT) devices;
   identifying, by the content generation system, IOT data corresponding to each of one or more action attributes associated with the user action;
   generating, by the content generation system, one or more multimedia content corresponding to the IOT data and the one or more gestures, wherein the one or more multimedia content is generated by a trained machine learning model based on the IOT data associated with each of the one or more action attributes and the one or more gestures; and
   generating, by the content generation system, the VR content in real-time in response to the one or more gestures based on the one or more multimedia content.

2. The method as claimed in claim 1, wherein the one or more gestures are identified based on one or more virtual devices associated with the user.

3. The method as claimed in claim 1, further comprising training a machine learning model to generate the one or more multimedia content based on the IOT data from the one or more IOT devices and based on one or more gestures of the user.

4. The method as claimed in claim 3, wherein the machine learning model generates one or more updated multimedia content based on updated IOT data from the one or more IOT devices.

5. The method as claimed in claim 1, wherein generating the VR content comprises rendering the one or more multimedia content in 3-D space along with timestamp information of each IOT data.

6. The method as claimed in claim 1, wherein generating the VR content comprises changing user interface of a device associated with the user for rendering the VR content based on the one or more IOT devices in communication with the device associated with the user.

7. A content generation system for generating Virtual Reality (VR) content in real-time, the content generation system comprising:
   a processor; and
   a memory communicatively coupled to the processor, wherein the memory stores processor-executable instructions, which, on execution, causes the processor to:
   identify one or more gestures of a user while performing a user action associated with one or more Internet of Things (IOT) devices;
   identify IOT data corresponding to each of one or more action attributes associated with the user action;
   generate one or more multimedia content corresponding to the IOT data and the one or more gestures, wherein the one or more multimedia content is generated by a trained machine learning model based on the IOT data associated with each of the one or more action attributes and the one or more gestures; and
   generate the VR content in real-time in response to the one or more gestures based on the one or more multimedia content.

8. The content generation system as claimed in claim 7, wherein the processor identifies the one or more gestures using one or more virtual devices associated with the user.

9. The content generation system as claimed in claim 7, wherein the processor trains a machine learning model to generate the one or more multimedia content based on the IOT data from the one or more IOT devices and based on one or more gestures of the user, wherein the machine learning model generates one or more updated multimedia content based on updated IOT data from the one or more IOT devices.

10. The content generation system as claimed in claim 7, wherein the processor renders the one or more multimedia content in 3-D space along with timestamp information of each IOT data for generating the VR content.

11. The content generation system as claimed in claim 7, wherein the processor generates the VR content by changing user interface of a device associated with the user for rendering the VR content based on the one or more IOT devices in communication with the device associated with the user.

12. A non-transitory computer readable medium including instructions stored thereon that when processed by at least one processor cause the processor to generate Virtual Reality (VR) content in real-time by:
- identifying one or more gestures of a user 105 while performing a user action associated with one or more Internet of Things (IOT) devices;
- identifying IOT data corresponding to each of one or more action attributes associated with the user action;
- generating one or more multimedia content corresponding to the IOT data and the one or more gestures, wherein the one or more multimedia content is generated by a trained machine learning model based on the IOT data associated with each of the one or more action attributes and the one or more gestures; and
- generating the VR content in real-time in response to the one or more gestures based on the one or more multimedia content.

* * * * *